March 31, 1964     L. L. MORIN     3,127,128

STRING HOLDER

Filed Oct. 25, 1960

INVENTOR.
LAWRENCE L. MORIN

3,127,128
STRING HOLDER
Lawrence L. Morin, P.O. Box 2164, Warren, Ariz.
Filed Oct. 25, 1960, Ser. No. 64,799
2 Claims. (Cl. 242—129.5)

This invention relates to meat cutters' equipment and more particularly to an accessory therefor.

It is an object of the present invention to provide a device which can be readily mounted upon a meat cutting block for supporting string ordinarily used by meat cutters and butchers.

Still a further object of the persent invention is to provide a meat cutter's string holder of the above type which can be readily mounted and removed, as may be required, in a simple and convenient manner.

Other objects of the invention are to provide a meat cutter's string holder bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
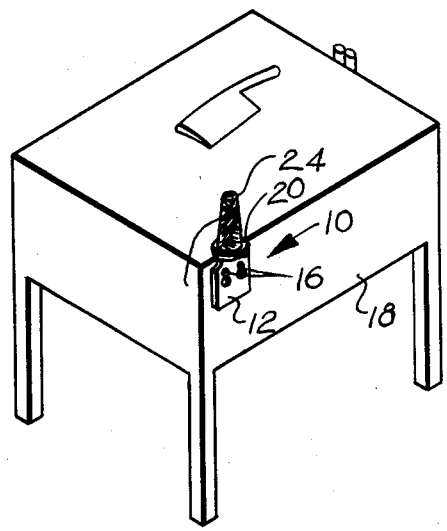
FIGURE 1 is a perspective view of a meat cutter's string holder made in accordance with the present invention in actual use.
Figure 2:
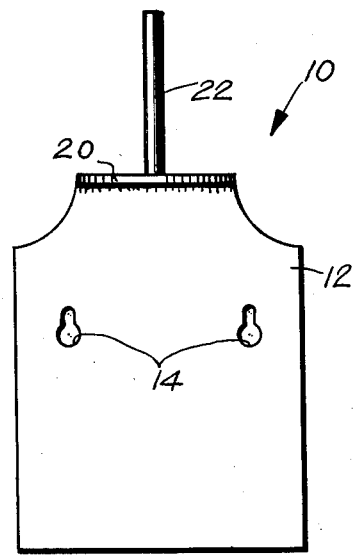
FIGURE 2 is an enlarged front plan view of the assembly shown in FIGURE 1.
Figure 3:
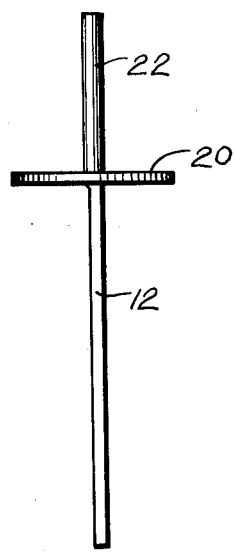
FIGURE 3 is an end elevational view of the device shown in FIGURE 2.

Referring now more in detail to the drawing, a meat cutter's string holder 10 made in accordance with the present invention is shown to include a main mounting plate 12 having a pair of bayonet slots 14 formed therein which are constricted in an upward direction, so as to slidably receive mounting screws 16 secured upon the side of the meat cutting block 18 therewithin, to lock the plate 12 in an erect position in response to engagement therewith.

The upper end of the main mounting plate 12 is provided with a substantially circular and transversely extending support plate 12, upon which an upstanding spindle 22 is integrally supported.

It will now be recognized that a ball of string 24 is conveniently rotatably supported upon the spindle 22 for convenient use whenever required. Also, the string holder may be readily removed from the cutting block 18 simply by exerting an upward pull upon the plate 12 and disengaging it from the supporting screws 16.

While various changes may be made in the detail construction, it shall be understood that such changes shall be within the spirit and scope of the present invention as defined by the appended claims.

What I claim as new and desire to protect by Letters Patent of the United States is:

1. In a string holder for meat cutting blocks comprising in combination a main mounting member comprised of a substantially flat rectangular plate, mounting means for detachably securing said mounting member upon the side of a cutting block, said mounting means comprising a plurality of upwardly restricted bayonet slots formed in said main mounting plate slidably receiving mounting screws therewithin, said mounting screws being permanently secured to the side of the cutting block, a spindle comprising an upstanding pin integral and coaxial with the said holder further comprising a support plate connecting said spindle to said main mounting member, said support plate being substantially circular and coaxial with said spindle.

2. A string holder for meat cutting blocks comprising a horizontal plate, a spindle mounted substantially centrally of said plate and extending upwardly therefrom, said plate having a portion thereof adapted to overlie the meat cutting block, a vertical plate mounted on the underside of said horizontal plate and lying in the vertical plane of the spindle, and means on said vertical plate for detachably securing said holder to a side of the meat block.

References Cited in the file of this patent

UNITED STATES PATENTS

| | | |
|---|---|---|
| 1,153,021 | Braithwaite | Sept. 7, 1915 |
| 1,224,106 | Good | Apr. 24, 1917 |
| 2,232,677 | Bouziane | Feb. 25, 1941 |